United States Patent [19]

Nolan

[11] Patent Number: 5,630,073
[45] Date of Patent: May 13, 1997

[54] PERSONAL ACCOUNT TRACKING SYSTEM

[76] Inventor: Jon D. Nolan, 7537 Berkshire Dr., NE., Cedar Rapids, Iowa 52402

[21] Appl. No.: 279,415

[22] Filed: Jul. 25, 1994

[51] Int. Cl.⁶ .................................................. G06F 17/60
[52] U.S. Cl. ............................................................ 395/245
[58] Field of Search .................................. 364/401, 408, 364/401 R; 283/58; 235/379

[56] References Cited

U.S. PATENT DOCUMENTS

| | | | |
|---|---|---|---|
| 3,980,323 | 9/1976 | Boyreau | 283/57 |
| 4,358,671 | 11/1982 | Case | 235/379 |
| 4,405,157 | 9/1983 | Bennett | 283/58 |
| 4,588,211 | 5/1986 | Greene | 283/70 |
| 4,623,965 | 11/1986 | Wing | 364/408 |
| 4,667,985 | 5/1987 | Leonard et al. | 283/58 |
| 4,864,111 | 9/1989 | Cabili | 235/437 |
| 4,974,878 | 10/1990 | Josephson | 283/67 |
| 5,117,356 | 5/1992 | Marks | 364/406 |
| 5,121,945 | 6/1992 | Thomson et al. | 283/58 |
| 5,193,055 | 3/1993 | Brown et al. | 364/406 |
| 5,433,483 | 7/1995 | Yu | 283/58 |

*Primary Examiner*—Donald E. McElheny, Jr.
*Attorney, Agent, or Firm*—Bacon & Thomas

[57] ABSTRACT

A system including both apparatus and a method enables individuals and small businesses to use checks and deposit slips for the purpose of tracking specific expenditures, income, assets, and liability items for budgetary or tax purposes. The checks or bank drafts are provided blanks for entering machine readable data. The system including apparatus for reading the data, processing it, and reporting results to the payor.

20 Claims, 14 Drawing Sheets

Set-Up

Check Cycle

New Process
(Check Cycle Continued)

New Process

Compensation

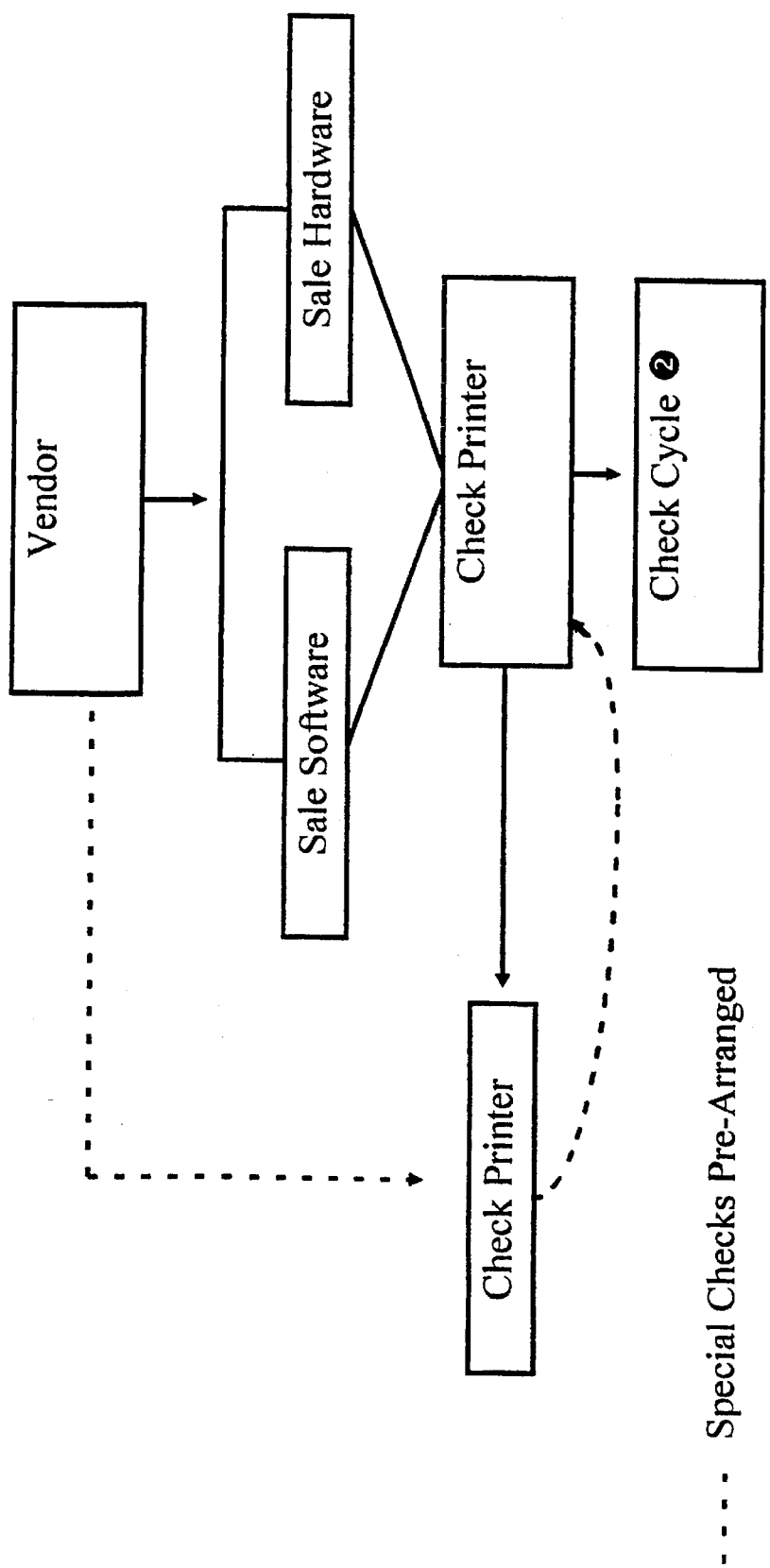

Check Cycle

New Process

Figure 5(a)

Sample A

3/8 Inches

Normal Check Width 2 3/4 Inches

Normal Check (Personal Size)

Institution | Account | Amount

6 Inches

Figure 5(b)

Sample B

Normal Business Account Width 2 3/4 + 3/8 Inches

Institution | Account | Amount

6 Inches

Figure 5(c)

Sample C 3 in

| | | A | B | 101 | 102 | 103 | 104 | 105 | 106 | 107 | 108 | 109 | 110 | 111 | 112 | 113 | 114 | 115 |
|---|---|---|---|---|---|---|---|---|---|---|---|---|---|---|---|---|---|---|
| | | O | O | O | O | O | O | O | O | O | O | O | O | O | O | O | O | O |

| Institution | Account | Amount |
|---|---|---|

8 1/4 inches

| 101 | Home Principal |
|---|---|
| 102 | Home Interest |
| 103 | Day Care |
| 104 | Medical |
| 105 | Entertainment |
| 106 | Travel |
| 107 | Home Improvement |
| 108 | Auto Business |
| 109 | Misc. Deductible |
| 110 | IRA |
| 111 | Tax/Property |
| 112 | Tax/Sales |
| 113 | |
| 114 | |
| 115 | Misc. |

3 Inches by 8 1/4 inches = Normal Business Check Size

PERSONAL ACCOUNT TRACKING SYSTEM

BACKGROUND OF THE INVENTION

1. Field of the Invention

This invention relates to a system for enabling an individual to automatically track specific expense related items, income, assets, and/or liabilities, for budgetary or tax purposes.

2. Description of Related Art

Numerous systems have been developed to automate financial record keeping for the purpose of tracking expense related items, income, assets, and/or liabilities, for budgetary or tax purposes. Nevertheless, although attractive in theory, most conventional systems are impractical for individual use. An individual in most cases cannot afford to hire a bookkeeper to gather the necessary data, and even though a number of commercial accounting programs are available which can be run by an individual with no special training on a personal home computer, most individuals do not have the time or desire to run such programs, which inevitably require the individual to manually enter the necessary data into the computer each time a transaction, i.e., the writing of a check or deposit slip, is carried out, or to scan prerecorded forms as described in U.S. Pat. No. 5,117,356 (Marks), which must be specially prepared and compared with the original checks or deposit slips to ensure accuracy.

Numerous individuals have finances which would benefit from automization, especially for budget planning or tax purposes, but the automization is useless if it requires generation of additional forms, manual verification and/or manual data entry. The simplest investments, such as a rental property or the purchase of ordinary common stocks, can generate an overwhelming amount of transaction data. Nevertheless, even the most user-friendly home accounting programs tend to end up on the shelf when the user discovers the effort needed to enter transaction data every time a cancelled check is returned or a deposit is made. Even where the bank makes available electronic or optically scannable records which can be entered in the home accounting program, the time necessary to verify the data often negates the time saved by automated entry. Despite the best of intentions, the cancelled checks and other documents concerning the transaction thus often end up in a "shoe box" until they are needed, for example, for taxes, or for an unforeseen crisis such as a divorce or bankruptcy, by which time the individual's records can at best be only partially reconstructed and at great difficulty. While such a possibility should motivate individuals to keep better records, especially in view of the currently available technology for that purpose, it simply does not.

The solution, as the inventor has discovered, lies in the use of the transaction documents themselves, usually in the form of checks or deposit slips, as the medium by which information on the transaction is gathered. However, even though checks already carry a variety of information, no system currently exists for utilizing the information-carrying potential of checks for the purposes envisioned by the inventor. Instead, as will be explained below, while it is common for banks to use information on the checks for their own accounting purposes, or for the payee of a check to gather data for its own benefit, the payor of the check still has to resort to pre-electronic age data collection systems.

A check or bank draft is a type of negotiable instrument which enables an individual bank account holder to order the bank to pay a third party the amount written upon the face of the check upon demand. Most checks or bank drafts are printed by an agent of the bank which holds the funds to be used in the transaction. When the account holder or "payor" transfers the pre-printed check as payment for a transaction, the payee presents the negotiable instrument to the payor's bank, either directly or via its own bank, and receives payment based on the amount written on the face of the check, after which the check is cancelled so that it cannot be used again. The payor's bank then uses a standard set of procedures to debit the payor's account, after which the payor is generally given the option of receiving the cancelled check.

A negotiable instrument must inherently carry certain information, generally provided by the payor, including the identity of the payee and payor, and the amount of the transaction, in order to enable the bank to carry out the transfer of funds as payment for the transaction. The negotiable instrument can be written on any medium, so long as it is tangible, but the most common medium is of course paper. A number of U.S. patents are concerned with processes for automizing the utilization of this information to facilitate payment, examples of which include U.S. Pat. No. 4,667,985 (Leonard et al.), and U.S. Pat. No. 4,974,878 (Josephson), all of which are concerned with machine reading of information provided by the payor and carried by the check for the purposes of facilitating the transaction. Another example is found in U.S. Pat. No. 4,864,111 (Cabili), in which the payor is asked to manually convert the amount of the check to machine readable form by filling in boxes below the amount, in order to facilitate automated processing of the check by the bank.

A recent trend has been for businesses to accumulate information concerning individual spending patterns, generally by tracking credit or debit card purchases, and creating a database on the individual. An extension of this concept has been to use checks as the medium for automatically transferring and collecting such information. It has, for example, been proposed in U.S. Pat. No. 4,974,878 (Josephson) to combine the payment coupons which normally accompany certain types of commercial transactions with the actual negotiable instrument or check, thus eliminating the need to process separately the two documents and permitting the negotiable instrument to serve as the medium of information transfer between the payor and the payee, not only of information necessary to facilitate payment but also of additional information. Conversely, a system was proposed in U.S. Pat. No. 4,405,157 (Bennett) in which an individual payee is induced to provide information to the payor by using a negotiable instrument as a reward and, subsequent to cashing or deposit by the payee, as the medium of information exchange. Under this system, the individual is sent a check on the back of which is printed a survey to be filled out by the individual, the printed survey form being returned to the survey firm as a cancelled check.

Despite similarities between the present invention and the above proposed systems, however, each differs fundamentally from the invention in that none of the proposed systems is solely for the benefit of an individual (or payor), utilizing information provided by the individual (or payor). The system disclosed in U.S. Pat. No. 4,974,878 (Josephson) uses information provided by the payor for the payee's benefit, while the system of U.S. Pat. No. 4,405,157 (Bennett) uses information provided by the payee for the payor's benefit, and the system of U.S. Pat. No. 4,864,111 (Cabili) uses information provided by the payor for the bank's benefit. Therefore, none of the above systems can be used by a payor (or, according to one aspect of the invention, a depositor) to automatically track information about the payor (or depositor) for the benefit of the payor (or depositor).

One system which does use information provided by the payor for the benefit of the payor is, of course, the memo line at the bottom left hand corner of the check. In fact, a variation of this age-old system, in which the memo space was replaced by boxes to be filled in with category numbers, was actually patented (U.S. Pat. No. 3,980,323 (Boyreau)). However, even the Boyreau patent did not suggest the overall concept of using information provided by the payor to help automate the payor's own record keeping.

The present invention lies in the realization that such a transfer of information—from the payor to the payor using checks or deposit slips as the medium of transfer—can be used to avoid the need for an individual to manually keep a separate set of books or to manually enter data in an automated accounting program for the purpose of tracking specific expense related items, income, assets, and/or liabilities. Instead, the act of payment itself serves as the means by which data is collected and made available for automated processing for the payor's benefit, with the transaction medium doubling as the medium by which data is collected for subsequent automated processing and/or storage.

SUMMARY OF THE INVENTION

It is therefore a primary objective of the invention to provide a system which permits an individual to maintain financial records with a minimum of effort, and overcome the disadvantages (heretofore not even appreciated by those skilled in the art) of systems such as those disclosed in patents to Boyreau (a mere variation of the completely manual memo line included on most checks), Cabili (the payor enters the amount of the check in a form machine readable by the bank), and Marks (suggesting use in general of machine readable forms to facilitate data input to a personal accounting program, as opposed to use of the checks or deposit slips themselves.)

It is a second objective of the invention to provide a system of tracking transaction data in which the data is recorded during the act of carrying out the transaction, all subsequent data collection and entry steps being performed by a machine which may be operated either by the individual, his or her bank, or a third party provider of the service.

In the case of a bank or third party provider, it is yet another objective of the invention to enable the bank or third party to maintain the individual's records at minimum cost and virtually no effort at all on the part of the individual.

These objectives are accomplished by providing a system which includes means by which, in association with the act of payment or deposit of funds into an account, the payor/depositor is enabled to enter information about the underlying transaction while carrying out the transaction, and means for subsequently automatically reading the information and storing it in electronic form for automated processing.

In one embodiment of the invention, the transaction data entry means is provided on a check or payment slip in the form of machine readable blanks, to be filled in by the payor/depositor using a writing instrument, the information in the blanks being converted into electronic form by an optical scanner possessed either by the individual, or by a commercial concern acting as an agent of the individual, for further automated processing.

As a result, the only effort needed to maintain a complete set of records is the effort necessary to fill out the appropriate blanks when writing a check or deposit slip, making automated bookkeeping available for the first time to the general public. Furthermore, the previously underused home accounting program will find new markets once the individual is relieved of the necessity of having to manually enter every transaction via a computer keyboard.

BRIEF DESCRIPTION OF THE DRAWINGS

FIGS. 4a, 4b, and 4c form a flow chart which illustrates an application of the invention in which the inventive system is operated and maintained solely by the individual.

FIGS. 5a, 5b, 5c, and 5d show transaction documents arranged according to the principles of the preferred embodiment of the invention to serve as a means for the collection and entry of transaction data for use in an automated personal account tracking system.

DETAILED DESCRIPTION OF THE PREFERRED EMBODIMENTS

The inventive system is a system which enables an individual to automatically track specific expenditures and thereby provide for an efficient means of accounting for budgetary or tax purposes with minimum effort on the part of the individual (or small business). However, the invention is not an accounting process per se, but rather a system, including a method and apparatus, which facilitates gathering and entry of the necessary transaction data. Any "accounting" process used in connection therewith forms no part of the invention except insofar as the process influences the type of data entered. Further, while described in detail herein in order to disclose the best mode of practicing the invention, the types of data per se are also not a part of the invention for which protection is sought, except insofar as the inventive system may be characterized as being useful for processing the described types of data.

Figure 1:
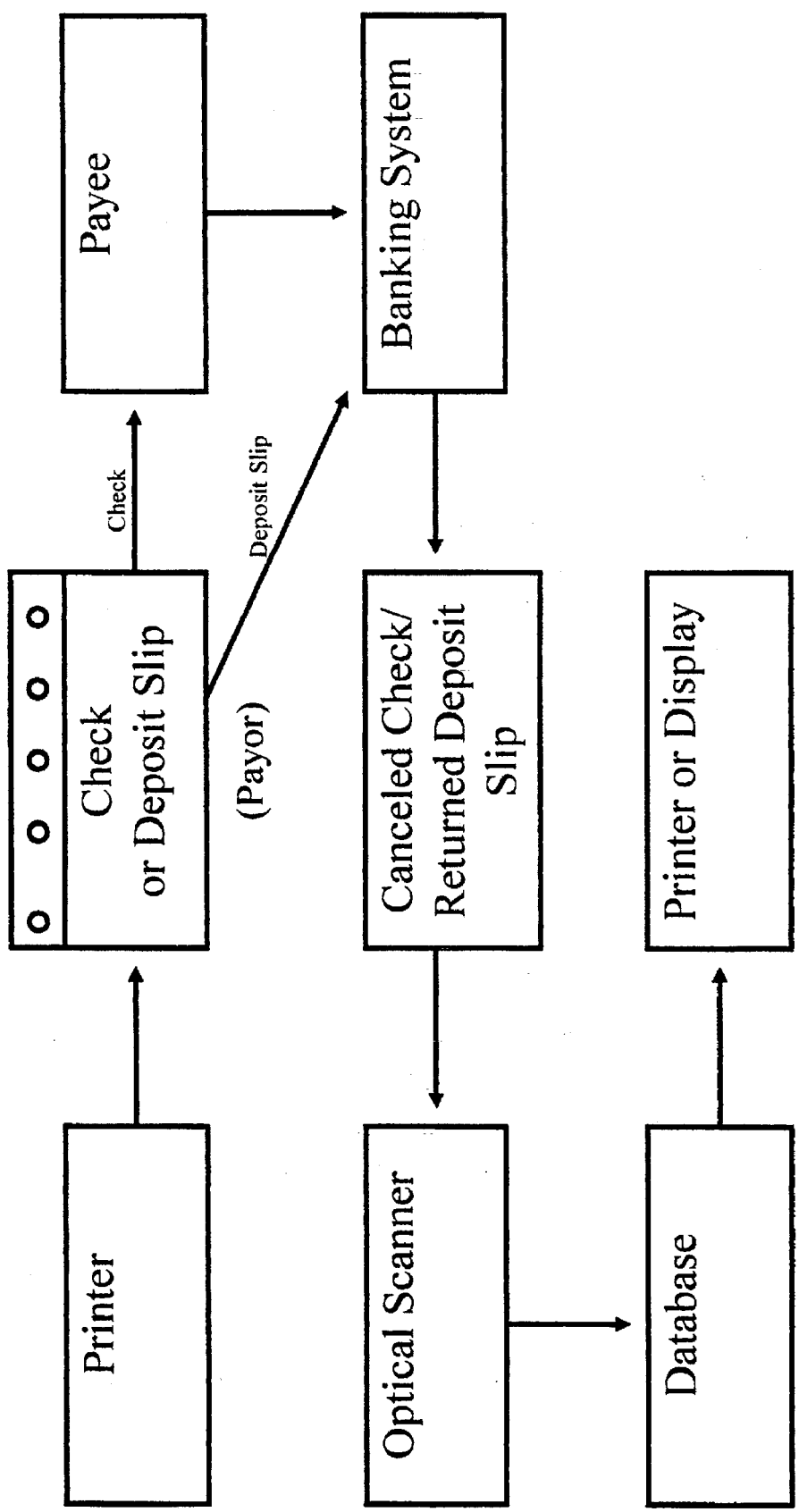
FIG. 1 is a block diagram showing the manner in which financial transaction data for an individual is entered and converted into electronic form by the preferred system.

Even though each of the apparatus used by the system is known, the invention lies not in individual apparatus but in the combination of apparatus to achieve advantages heretofore unknown, namely the ability for a private individual or small business to automate collection and entry of financial transaction data for tracking expense, income, assets, and liabilities. A block diagram of the system, shown in FIG. 1, illustrates the manner in which the individual elements of the system cooperate to achieve these advantages.

The tangible medium 1 on which data is entered is a check, or more generally a negotiable instrument, or a deposit slip containing individually customizable machine readable data entry blanks 2. The use of deposit slips will be explained in more detail below. Data concerning the transaction is entered onto the check by the payor, as will also be explained in more detail below. The check may be printed using a printer 3 by the payor, the payor's bank, or a third-party vendor. After entry of the data by the payor using a suitable writing instrument 4, the check is delivered or mailed to the payee 10 as payment for goods or services, after which the payee sends the check through the banking system 5 in order to collect payment.

The payee processes the check in a normal manner which is not changed by the preferred system. The check is cancelled upon payment, and the cancelled check 6 is returned to the payor as part of the normal business operations of the payor's bank. The payor, or an agent of the payor then uses an optical scanner 7 to optically scan the check in order to convert the data thereon into electronic form and enter the data into a data base 8 for subsequent processing, for example by one of the many home accounting programs which are currently available, or by a program specially written for use with the preferred system. The results may then be reported using appropriate means 9 such as a printer or cathode ray tube (CRT) display.

Figure 2A:
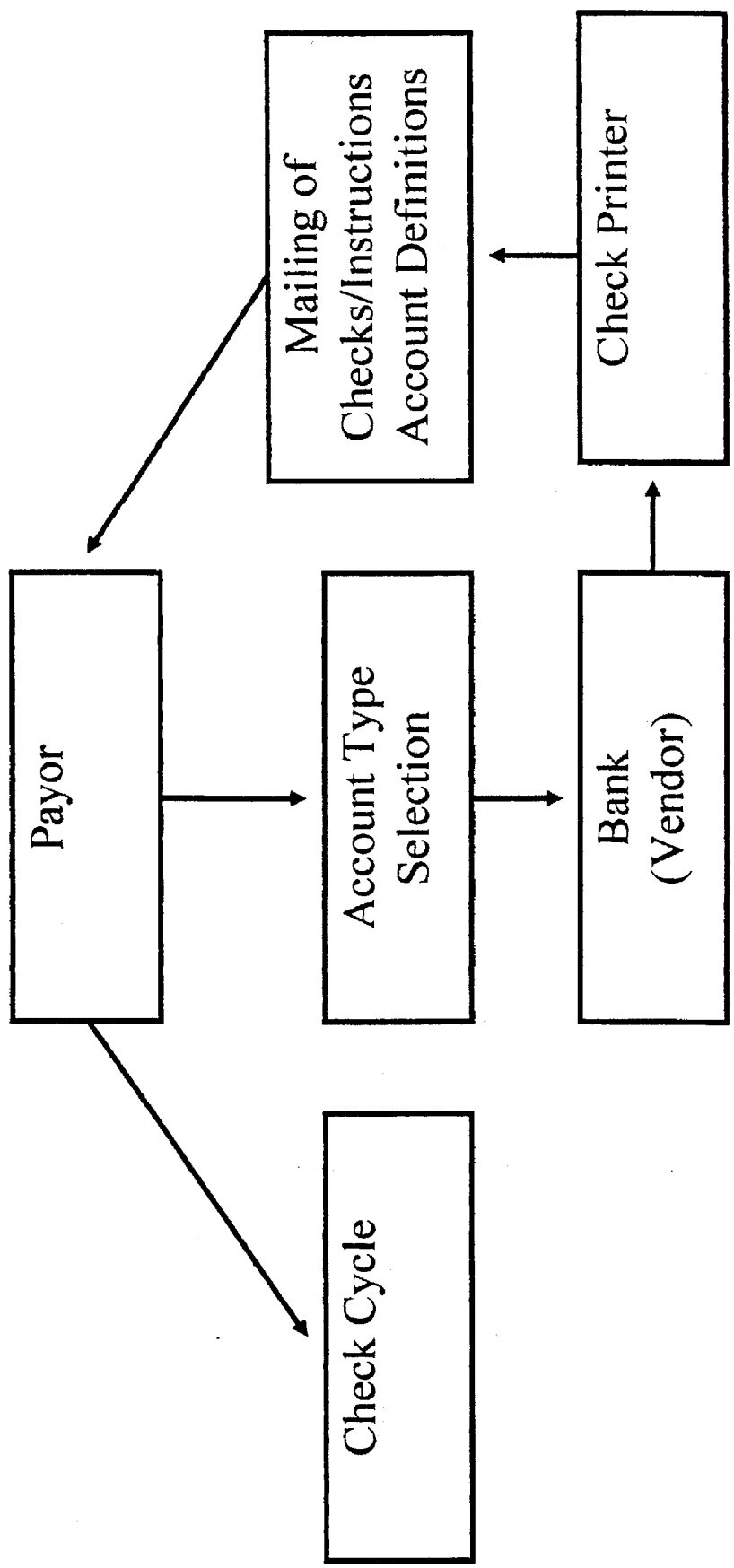
FIGS. 2a, 2b, and 2c form a flow chart which illustrates an application of the invention in which the inventive system is operated by the individual user's bank.
Figure 2B:
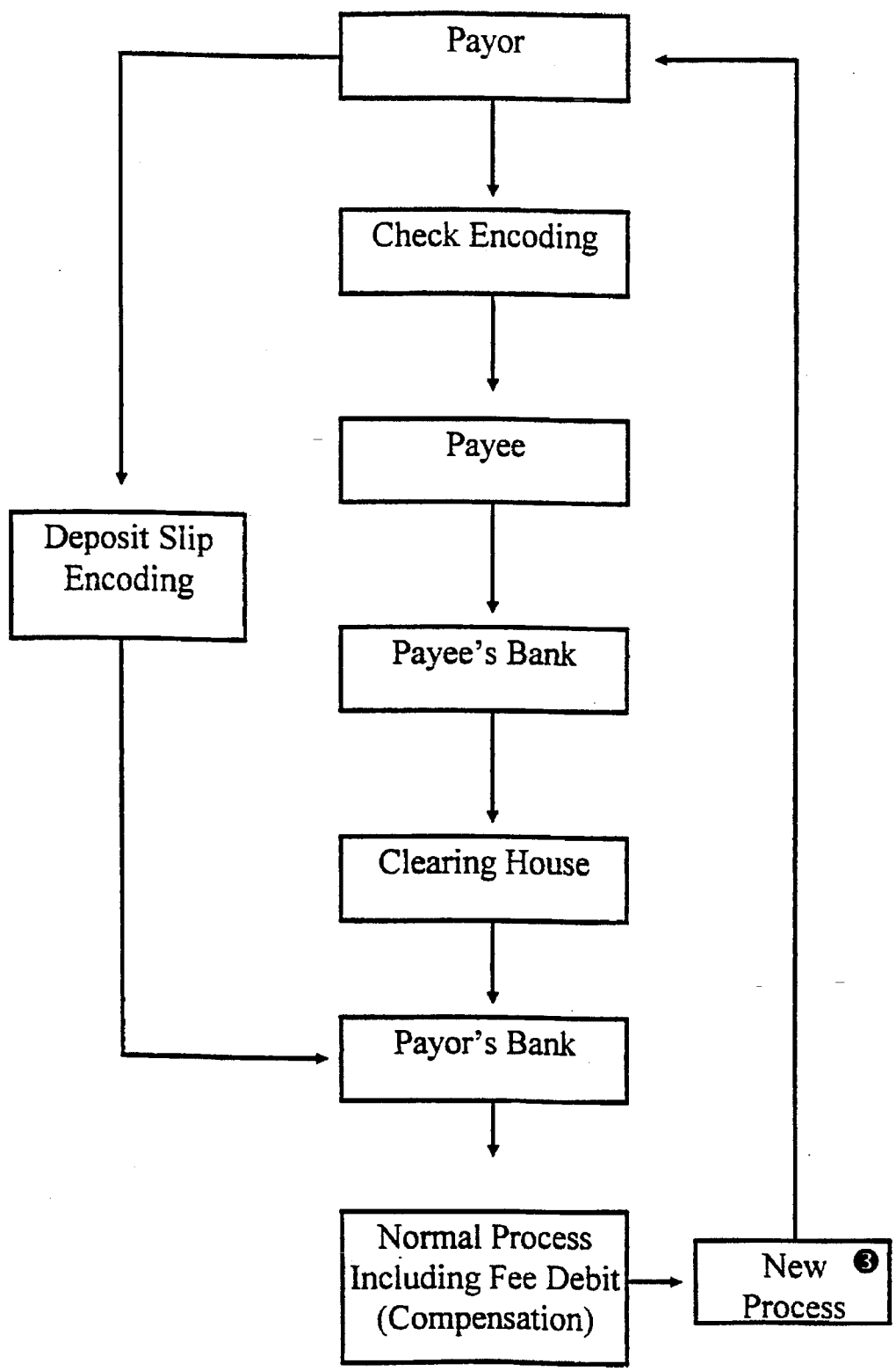
Figure 2C:
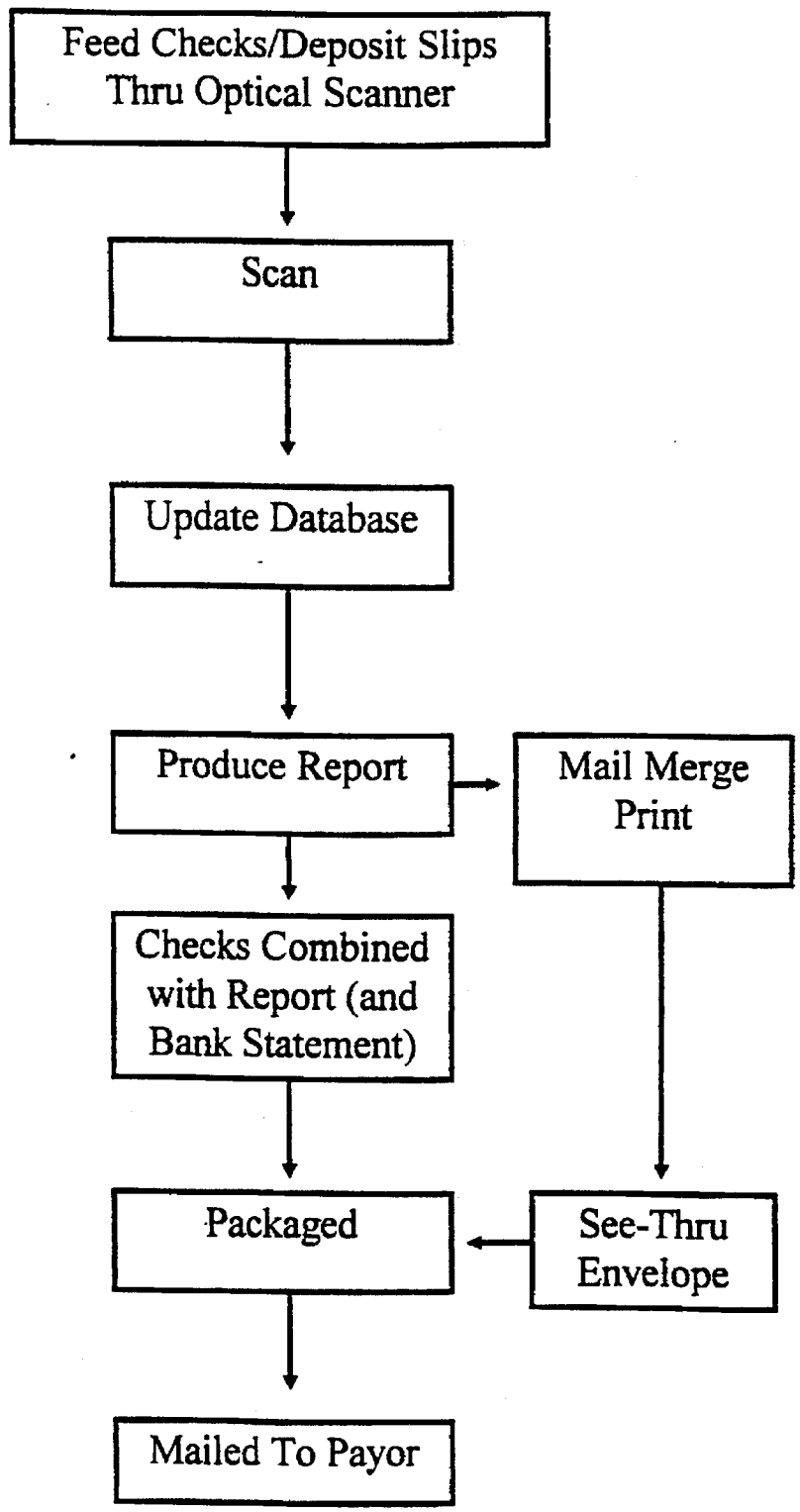
Figure 3A:
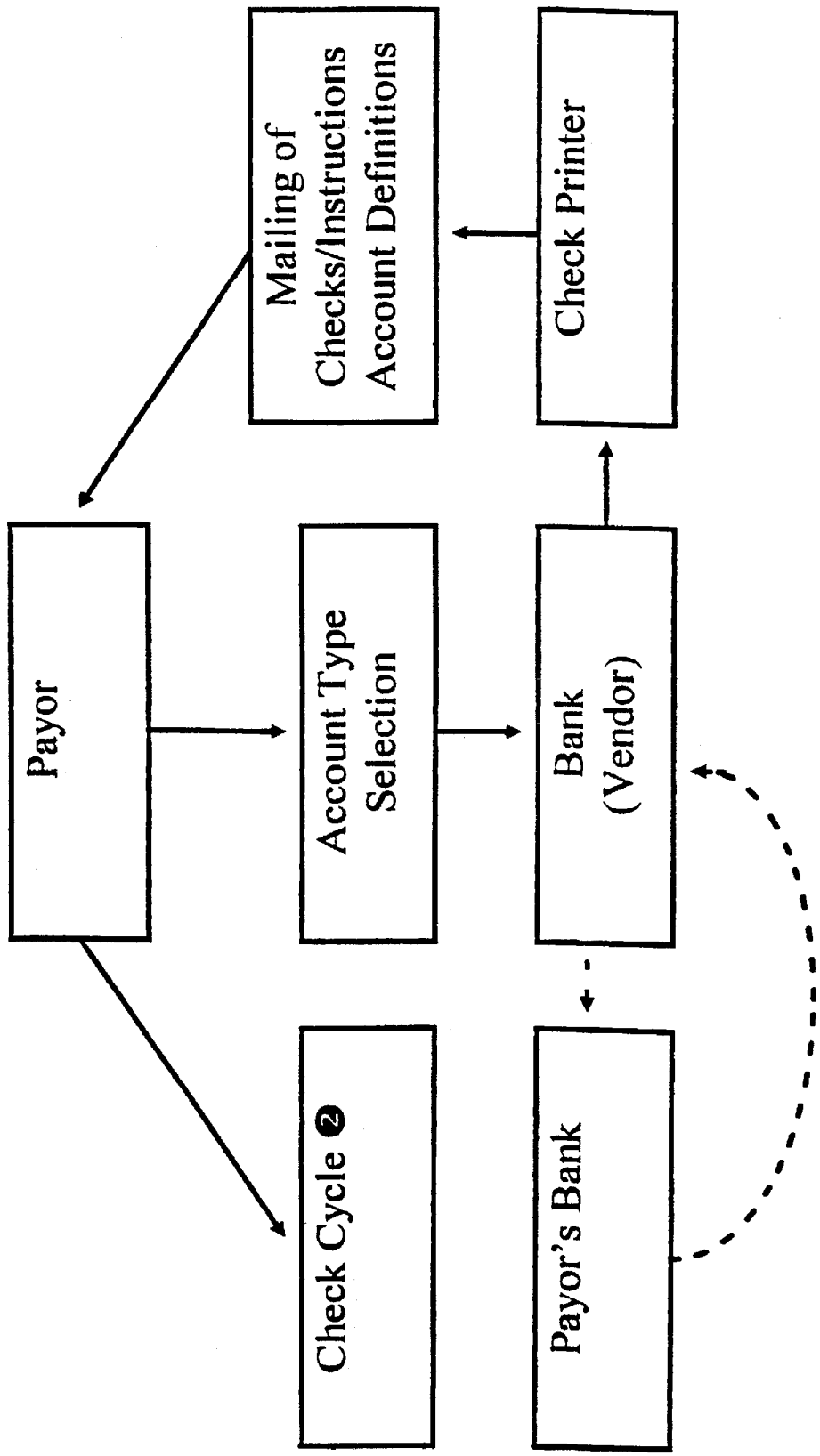
FIGS. 3a, 3b, 3c, and 3d form a flow chart which illustrates an application of the invention in which the inventive system is operated by a commercial entity other than the individual user's bank.
Figure 3B:
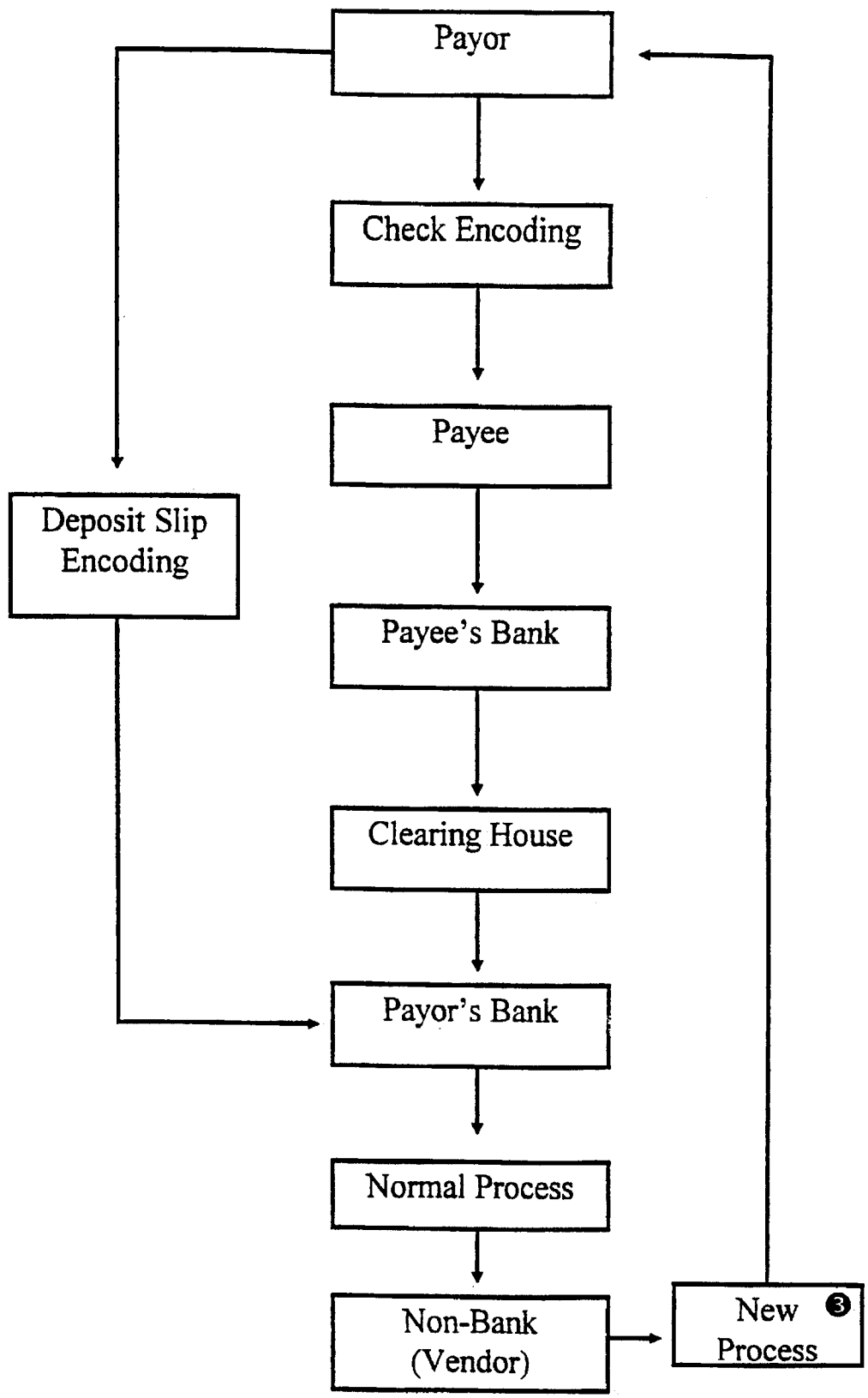
Figure 3C:
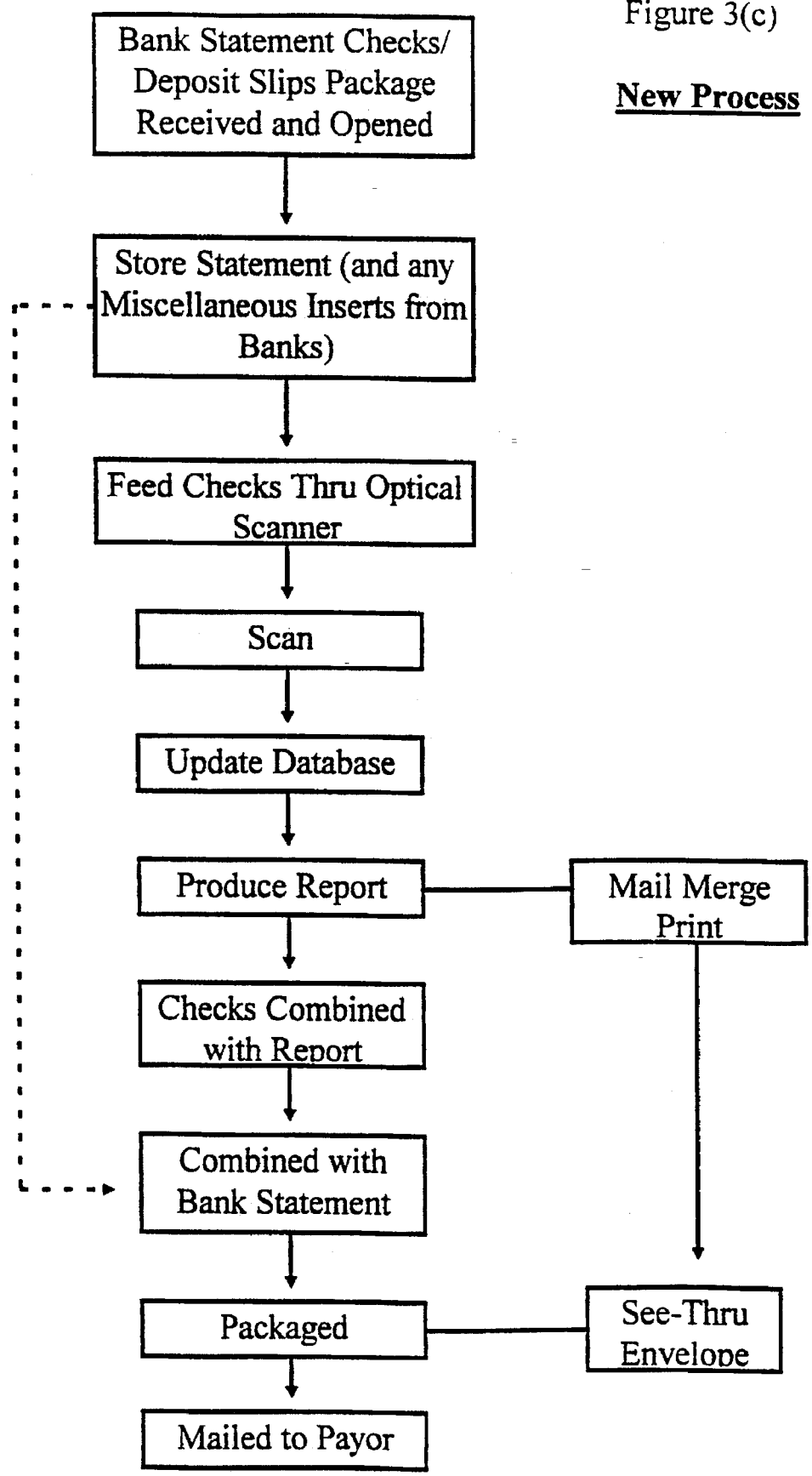
Figure 3D:
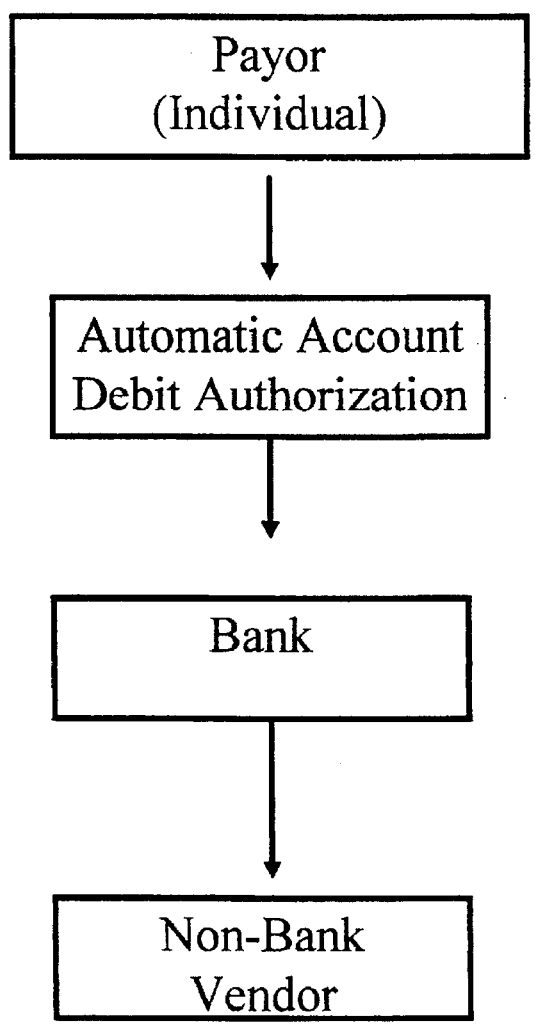
Figure 4B:
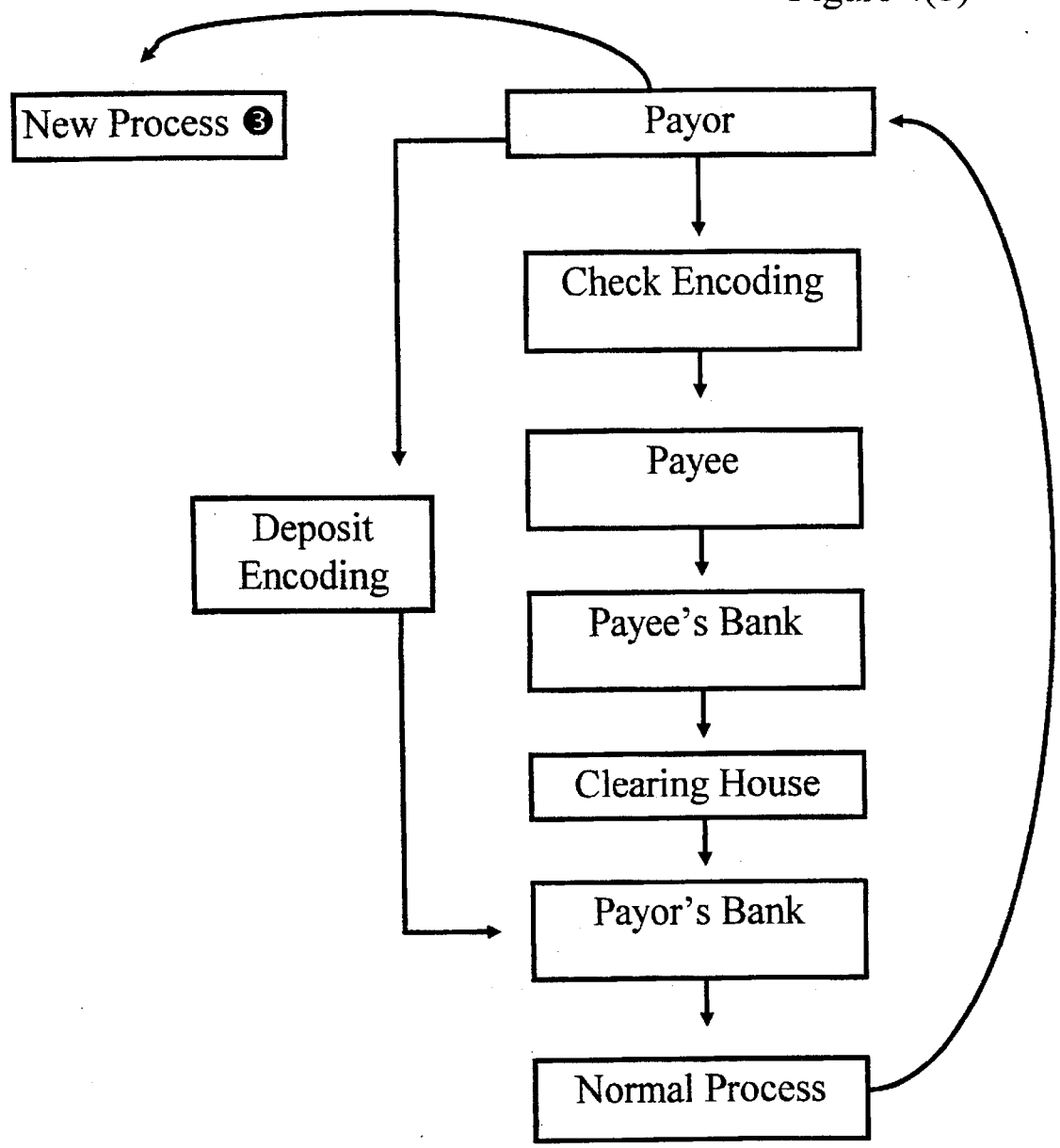

FIGS. 2a–2c, 3a–3d, and 4a–4c show applications of the inventive system which use special pre-printed checks and deposit slips, the production of which must be pre-arranged with a check printer (FIG. 2a and 3a), or which can also be carried out by the individual using one of the many graphics or check printing programs available for personal computers (FIG. 4a). A check must contain all information necessary for negotiability and meet the various requirements of the banking system, but otherwise can be printed using a wide variety of forms. FIGS. 5a–5c show examples of checks, and FIG. 5d shows a deposit slip, each of which includes the inventive data entry means described in more detail below.

In a preferred embodiment of the invention, the means of data entry 2 is in the form of boxes or circles provided on the face of the check to be filled in by the person writing the check. The individual boxes or circles are identified by a number and correspond with information categories. The information categories may either be predesignated by the system operator, or they may be user-defined. When the check is written, the box or circle which is adjacent to the applicable set of accounts numbers is filled in by the payor, the accounts number which is filled in corresponding with the appropriate category of expenditure. In addition, boxes or circles may be provided which can be filled in to identify a specific individual to which the expenditure will apply. The check shown in FIG. 5c includes a stub listing categories of expenditure to which the numbered spaces correspond, the check being removed from the stub before being used for payment.

The check cycle is detailed in FIGS. 2b, 3b, and 4b. The individual first selects account types, after which the bank or check vendor, or the individual, prints the checks. The payor then encodes the check and delivers it or sends it to the payee. The payee obtains payment at the payee's bank, which sends the check into the banking system via, for example, a federal reserve bank, to the payor's bank, at which time the check is paid and cancelled, and any fees deducted. The cancelled check may either be returned to the payor, kept by the bank, or sent to the check vendor for further processing as described below.

In the case of deposit slips, as is also shown in FIGS. 2b, 3b, and 4b, income tracking is made possible by imprinting the deposit slips with boxes or circles similar to those used on checks in order to enable the user to identify specific income sources upon deposit directly to the user's bank, as opposed to the indirect path followed by checks through the system.

If the checks are supplied by a bank or third-party vendor, a standard set of accounts for expenditure tracking and accounting may be pre-printed thereon, although the option of including custom payor defined accounts could also be provided. To satisfy the accounting needs of an individually owned small business, for example, a standard set of accounts offered by a bank or third party vendor might include the following items:

| | |
|---|---|
| 101. Furniture/Fixtures | 104. Vehicles |
| 102. Inventory | 105. Mortgage/Lease Payments |
| 103. Machines/Equipment | 106. Notes Payable |
| 107. Income | 115. Legal Expenses |
| 108. Advertising | 116. Licenses |
| 109. Auto Expenses | 117. Miscellaneous Expense |
| 110. Dues/Subscriptions | 118. Office Supplies |
| 111. Employee Benefits | 119. Payroll Taxes |
| 112. Freight | 120. Postage |
| 113. Insurance | 121. Rent |
| 114. Interest | 122. Repairs/Maintenance |
| | 123. Salaries/Wages |
| | 124. Taxes |
| | 125. Telephone |
| | 126. Travel/Entertainment |
| | 127. Utilities |
| | 128. Miscellaneous |

For an individual who uses the inventive system more for individual tax preparation purposes, the following set of accounts might be offered to meet the demands of this market segment:

| | |
|---|---|
| 101. Home/Improvements | 112. Entertainment |
| 102. Long-Term Savings | 113. Medical/Dental |
| 103. IRA Payments | 114. Mortgage Interest |
| 104. Stocks/Bonds | 115. Safe Deposit |
| 105. Mutual Funds | 116. Taxes-Federal |
| 106. Mortgage | 117. Taxes-State |
| 107. Long-Term Loans | 118. Taxes-Local |
| 108. Income/Job | 119. Taxes-Property |
| 109. Income/Dividends | 120. Uniforms |
| 110. Auto Expenses | 121. Union Dues |
| 111. Child Care | 122. Miscellaneous |

Additional items could be allowed for customization purposes, in order to provide the customer flexibility to meet his/her specific needs. For individual budgetary purposes, some of the tax categories could be eliminated, and household expenditure categories such as auto payments, clothing, gas, groceries, insurance, rent, utilities, and so forth could be substituted.

In accordance with this application of the inventive system, optical scanning device 7 would read and identify the following information:

A. The account number and financial institution number.
B. The check number
C. The amount of the check encoded on the bottom right of the check
D. The code expenditure/accounting category.

The specific manner in which items A–C are determined does not form a part of the invention, but a number of different systems are currently used by banks and others during the normal course of check processing.

A variety of optical scanners capable of recognizing whether a box or circle has been filled in are available and may be programmed to output the correct information. The data base 8 for the payor is updated with information obtained from the scanner, after which a report is produced and, in the case of a bank or third party vendor (FIGS. 2c and 3c), sent to the individual. In the case of the application shown in FIGS. 3a to 3d, in which the system is operated by a non-bank vendor with proper authorization, the payor's bank may be instructed to send the cancelled checks to the non-bank vendor for processing. The check cycle of FIG. 3b is identical to that shown in FIG. 2b, and the processing cycle of FIG. 3c is identical to that of FIG. 2c, except that it is carried out by the non-bank vendor. Payment to the third party may be via an automatic debit, as shown in FIG. 4d.

Figure 4C:
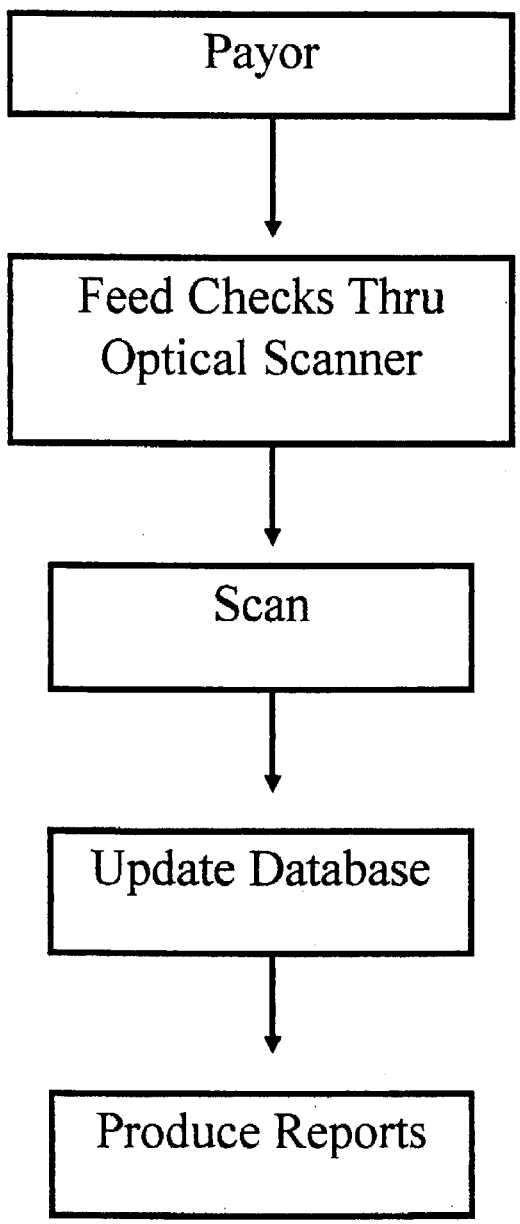
Figure 5D:
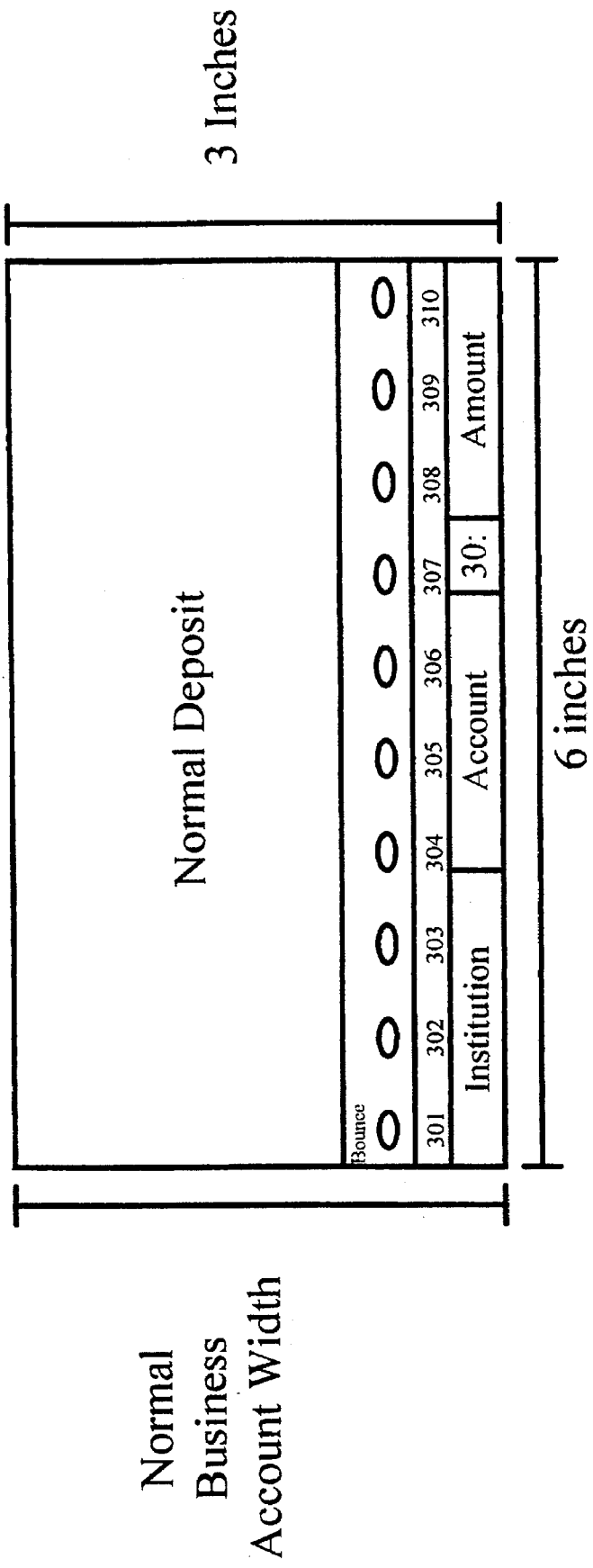

For the individual operator, FIG. 4c, a variety of lower price range optical scanners are available for use with a personal computer using software designed to be maintained and operated by an individual without specific computer expertise or training. The individual would code the checks and deposit slips as they are written, and upon receiving the bank statement from the bank, along with the cancelled checks and deposit slips, the checks and deposit slips would then be scanned, the data automatically being stored and processed on the individual's personal computer without the need for time-consuming manual entry of the data.

Although it is preferred that the checks be scanned after cancellation because it is possible for a check to be stopped by the payor, or to be returned due to insufficient funds, it would also be within the scope of the invention for the payor to scan the check before it is mailed, or for a vendor of the preferred service to scan a check before forwarding it to the payee.

After conversion of the subject data into electronic form by scanning, a custom or commercial computer program is used to process the four categories of data obtained by the scanner as follows:

A. Income categories are read by optical scanner 7 from the deposit slip and credited to income.

B. Assets may or may not have a beginning credit balance assigned by the customer and fed into the data base upon setting up the service. Home assets, for example, would have a beginning balance. Any payments for the appropriate improvements would add to the existing basis or credit balance. The purchaser may, however, have an account set up for stock/bonds but have a zero balance upon setting up the account. Any payments to purchase stocks or bonds will initiate a credit balance to that asset account. Payments which apply to an asset category are read by the scanner from the check and credited to the asset. Debits not involving a sale (i.e., a deposit) would have to be manually entered.

C. Liability items would have a beginning credit balance assigned and fed into the data base upon setting up this service for the customer. Payments which reduce liabilities would be read by the scanner from the check and debited to liability.

D. Expense categories are read by scanner 7 from the check and credited to expenses.

Preferably, data base 8 includes appropriate fields divided by account number and financial institution, subdivided by the various pre-designated individuals whose expenditures are tracked by the system if applicable, and further subdivided by the specific customer defined expenditure categories. Data base 8 could also contain specific information about the account owner, such as the name, address, and phone number.

Normally, one check will be used by the inventive system to update one accounting category at a time. However, when a check payment is made, it is also possible for the one check to be used to update more than one category by filling in as many blanks as desired to correspond to the various categories to which the payment should apply. Optionally, in that case, the user could hand-write the monetary amount corresponding to the lowest account number category which was filled in on the check in the memo section of the check, followed by a slash, after which the next monetary amount corresponding to the next category may be written. When the check is scanned and more than one category has been filled in, the check will be flagged so that a person can input into the computer the appropriate data to log the transaction.

If a third-party vendor or the payor's bank supplies the service, an additional fee would probably apply if the number of transactions of this type exceeds a predetermined limit.

The last structural element necessary to implement the preferred system is the means 9 for reporting the results of the tracking, which means may be a printer for printing an accounting report in addition to a normal bank statement, or a magnetic or optical disk drive for electronically recording the statement and displaying it on a CRT.

Finally, the inventive system also includes a preferred method of implementation which involves the steps of, as is apparent from the above description, providing means for entering machine-readable data on a check or deposit slip, manually entering the data, transferring the check or deposit slip for the purpose of causing funds to be transferred to or from an account, receiving the check or deposit slip, reading data by means of an optical scanner, converting the data into electronic form for further processing and/or storage, and reporting or displaying results of the processing.

It will of course be appreciated by those skilled in the art that variations of the invention not mentioned above may be possible, and that the invention is to be construed as covering all such variations which are not excluded by the prior art. Therefore, it is intended that the invention not be limited by the above examples or description, but rather that it be defined solely by the appended claims.

I claim:

1. A system for enabling automated entry of transaction data into a data base for the purpose of tracking specific expenditures, income, assets, and liability items, comprising:

negotiable instrument means including a tangible medium which carries payment order means for enabling a first party to order a second party to pay a third party for a purchase;

machine readable means on said negotiable instrument means for enabling the first party to manually enter information concerning said payment, other than an amount of said payment, on said negotiable instrument means during preparation of the order by the first party;

automatic reading means for automatically reading said information and entering said information into a database; and information processing means for processing said information for use by the first party.

2. A system as claimed in claim 1, wherein said tangible medium is a check.

3. A system as claimed in claim 2, further comprising manual entry means for manually entering said information concerning said payment.

4. A system as claimed in claim 3, wherein said manual entry means is a writing instrument.

5. A system as claimed in claim 1, wherein said automatic reading means is an optical scanner.

6. A system as claimed in claim 1, wherein said information processing means includes a personal computer and an accounting program.

7. A system as claimed in claim 1, further comprising means for displaying results of said processing.

8. A system as claimed in claim 7, wherein said display means comprises a printer and paper.

9. A system as claimed in claim 1, further comprising means including a printer for generating said negotiable instrument means and said machine readable means.

10. A system for enabling automated entry of transaction data into a data base for the purpose of tracking specific expenditures, income, assets, and liability items, comprising:

deposit slip means including a deposit slip which carries deposit order means for ordering a second party to deposit funds into an account owned by a first party;

machine readable means on said deposit slip for enabling the first party to manually enter information concerning said deposit, other than an amount of said deposit, on said deposit slip during preparation of the order by the first party;

automatic reading means for automatically reading said information and entering said information into a database; and information processing means for processing said information for use by the first party.

11. A method of automatically entering transaction data into a data base for the purpose of tracking expenditures, income, assets, and liability items, comprising the steps of:

providing machine-readable means for entering machine-readable transaction data, other than data concerning an amount of payment or deposit, on a check or deposit slip;

manually entering the data on said machine-readable means;

transferring the check or deposit slip from the payor or depositor for the purpose of causing funds to be transferred to or from an account;

transferring the check or deposit slip back to the payor or depositor after said funds have been transferred;

after transfer back to the payor or depositor, using a machine to read and convert the data into electronic form for further processing and storage in said database; and processing said information for use by the first party.

12. A method as claimed in claim 11, wherein the step of entering the data comprises the step of using a writing instrument to fill in blanks printed on the check or deposit slip.

13. A method as claimed in claim 12, wherein said step of reading and converting the data comprises the step of optically scanning the check or deposit slip.

14. A method as claimed in claim 11, further comprising the step of reporting results of said processing.

15. A method as claimed in claim 14, wherein the step of reporting comprises the step of printing a report of expenditures by category and providing said report to a payor of said check.

16. A method as claimed in claim 11, further comprising the steps of printing said check and said machine-readable means, and delivering the check to a payor of the check.

17. A method as claimed in claim 16, further comprising the step of causing a vendor of said check to carry out said step of reading and converting the data, and also to maintain said data base for the benefit of said payor.

18. A method as claimed in claim 16, further comprising the step of providing the payor with an optical scanner for reading said data.

19. A method as claimed in claim 11, further comprising the step of providing a payor of the check with means for printing said check and for printing said machine-readable means on said check.

20. A device for conveying transaction data to a data base, comprising:

negotiable instrument/deposit slip means including a tangible medium which carries an order for transferring funds to or from a bank account;

machine readable means on said negotiable instrument/deposit slip means for enabling a holder of the bank account to manually enter information concerning said order, other than an amount of funds transferred, on said negotiable instrument/deposit slip means during preparation of said order, whereby said information upon entry is thereby placed in a form in which it can be automatically read into a database in order to track categories of expenditures, income, assets and liability items of said account holder; and means for retrieving said information from the data base for use by the account holder.

* * * * *